United States Patent
So et al.

(10) Patent No.: US 6,874,326 B2
(45) Date of Patent: Apr. 5, 2005

(54) AIR CONDITIONING SYSTEM WITH TWO COMPRESSORS AND METHOD FOR OPERATING THE SAME

(75) Inventors: Min Ho So, Seoul-si (KR); Won Hee Lee, Seoul-si (KR); Chang Min Choi, Seoul (KR); Yoon Jei Hwang, Seoul (KR); Deok Huh, Buchun-si (KR); Cheol Min Kim, Kwangmyung-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/377,637

(22) Filed: Mar. 4, 2003

(65) Prior Publication Data

US 2004/0003610 A1 Jan. 8, 2004

(30) Foreign Application Priority Data

Jul. 3, 2002 (KR) ................................ 10-2002-0038375

(51) Int. Cl.[7] .................................................. F25B 7/00
(52) U.S. Cl. .......................... 62/175; 62/158; 62/228.5; 62/230; 417/5; 417/12; 417/287; 417/290; 417/426; 388/903
(58) Field of Search .......................... 62/175, 230, 157, 62/158, 228.5; 417/1, 5, 12, 53, 286, 287, 290, 426; 236/1 EA; 388/903

(56) References Cited

U.S. PATENT DOCUMENTS

| | | | | |
|---|---|---|---|---|
| 5,440,891 A | * | 8/1995 | Hindmon et al. | 62/117 |
| 6,119,469 A | * | 9/2000 | Elwood | 62/126 |
| 6,216,479 B1 | * | 4/2001 | Elwood | 62/230 |
| 6,233,954 B1 | * | 5/2001 | Mehaffey et al. | 62/175 |
| 6,434,957 B1 | * | 8/2002 | Nishizuka et al. | 62/175 |
| 6,540,148 B1 | * | 4/2003 | Salsbury et al. | 236/1 EA |
| 6,625,996 B2 | * | 9/2003 | Nakajima et al. | 62/175 |

* cited by examiner

Primary Examiner—Marc Norman
(74) Attorney, Agent, or Firm—Greenblum & Bernstein, P.L.C.

(57) ABSTRACT

Disclosed are an air conditioning system with two compressors and a method for operating the same, so as to variably change a compression capacity of a refrigerant according to the variation of cooling load. Herein, when a full operation order is inputted to the two compressors in order to satisfy increased cooling load, the first compressor is first operated, and then the second compressor having a compression capacity of a refrigerant smaller than that of the first compressor is additionally operated, so that a current peak value for operating the compressors does not exceed an allowable current range of a circuit breaker installed in a home or building, thereby safely controlling the air conditioning system and simultaneously allowing the current to be provided to other electric appliances, thus improving users' convenience.

3 Claims, 5 Drawing Sheets

AIR CONDITIONING SYSTEM WITH TWO COMPRESSORS AND METHOD FOR OPERATING THE SAME

BACKGROUND OF THE INVENTION

1. Field of the Invention

The present invention relates to an air conditioning system with two compressors and a method for operating the same, and more particularly to an air conditioning system with two compressors and a method for operating the same, in which a value of a current required to operate the compressors does not exceed an allowable current range of a circuit breaker installed in a home when a first compressor is first operated and then a second compressor is sequentially operated, thereby safely controlling the air conditioning system and other household electric appliances using electric power.

2. Description of the Related Art

FIG. 1 is a block diagram illustrating a flow of a refrigerant in a conventional air conditioning system, and FIG. 2 is a graph showing the variation of current value in the conventional air conditioning system. With reference to FIGS. 1 and 2, the conventional air conditioning system is described, as follows.

Generally, a conventional air conditioner achieves a cooling function via a cooling cycle formed by a refrigerant sequentially passing through a compressor, a condenser, an expansion valve, and an evaporator. Recently, air conditioners have used a four-way valve 20 for selecting the flow direction of the refrigerant installed in a conventional cooling apparatus, thereby reversing the function of each component so as to convert the cooling cycle into a heating cycle, in which an indoor heat exchanger 50 serves as a condenser and an outdoor heat exchanger 30 serves as an evaporator so as to discharge warm air into a room. Hereinafter, such an air conditioner is referred to as a heat-pump air conditioner.

Therefore, the heat-pump air conditioner achieves the cooling or heating cycle by selecting either of the cooling and heating modes, thereby being unlimitedly applicable in all seasons.

Hereinafter, the them "air conditioner" denotes the heat-pump air conditioner having cooling and heating functions, as well as the general air conditioner having a cooling function.

The conventional air conditioning system circulates a refrigerant via the cooling cycle shown in FIG. 1. With reference to FIG. 1, the conventional air conditioning system is described, as follows.

The conventional air conditioner comprises a plurality of compressors 10 for compressing a gaseous refrigerant in a low-temperature and low-pressure state so as to convert it into a high-temperature and high-pressure state. The compressors 10 includes first and second compressors 11 and 12 having different compression capacities of the refrigerant. The total compression capacity of the refrigerant in the air conditioning system is variably changed by simultaneously operating the first and second compressors 11 and 12 or selectively operating the first and second compressors 11 and 12, i.e. operating the first compressor 11 and stopping the second compressor 12.

Check valves 11a and 12a respectively prevent the reverse-flow of the refrigerant compressed by the first and second compressors 11 and 12.

A four-way valve 20 is further installed in the heat-pump air conditioner having the cooling and heating functions. The four-way valve 20 converts the flow direction of the refrigerant, thereby forming the cooling or heating cycle according to the converted flow direction of the refrigerant. Therefore, the general air conditioner only having the cooling function does not comprise the four-way valve 20. The four-way valve 20 supplies the refrigerant discharged from the compressors 10 to an outdoor heat exchanger 30 in a cooling mode, or to an indoor heat exchanger 50 in a heating mode, thereby alternating a circulation direction of the refrigerant.

The outdoor heat exchanger 30 serves as condensing means for condensing the gaseous refrigerant in the high-temperature and high-pressure state into a liquid refrigerant. An outdoor unit includes the outdoor heat exchanger 30, and an outdoor blower (not shown) installed next to the outdoor heat exchanger 30 so as to discharge air toward the outdoor heat exchanger 30 and increase heat exchange efficiency. The outdoor blower includes an outdoor fan (not shown) and a motor (not shown).

An expansion valve 40 expands the liquid refrigerant condensed by the condensing means into a two-phase refrigerant of liquid and gaseous phases in a low-temperature and low-pressure state.

The indoor heat exchanger 50 serves as evaporating means for converting the two-phase refrigerant into a gaseous refrigerant by absorbing external heat. An indoor unit includes the indoor heat exchanger 50, and an indoor blower (not shown), installed next to the indoor heat exchanger 50 so as to discharge cold air into the room. The indoor blower includes an indoor fan (not shown) and a motor (not shown).

An accumulator 60 separates the liquid phase from the two-phase refrigerant discharged from the indoor heat exchanger 50, and then supplies only the gaseous phase to the first and second compressors 11 and 12. Thereby, a cooling cycle consisting of compression, condensation, expansion, and evaporation is achieved.

In order to effectively achieve the cooling function of the above-described air conditioner, the compressors 10 include the first and second compressors 11 and 12 having different capacities. Herein, the first compressor 11 has a 60% compression capacity of the refrigerant, and the second compressor 12 has a 40% compression capacity of the refrigerant.

Therefore, when a cooling load is heavy, the first and second compressors 11 and 12 are simultaneously operated so that the total compression capacity of the refrigerant becomes 100%. When the cooling load is light, only the second compressor 12 is operated so that the compression capacity of the refrigerant totals only 40%. Thereby, the compression capacity of the refrigerant is variably changed.

As shown in FIG. 2, in order to rapidly satisfy the heavy cooling load, a current having an increased peak value (−Peak' to +Peak') for simultaneously operating the first and second compressors 11 and 12 is supplied to the first and second compressors 11 and 12 so that the total compression capacity of the refrigerant becomes 100% (P12). After that, a holding current for maintaining the simultaneous operation of the first and second compressors 11 and 12 is supplied to the first and second compressors 11 and 12 (M12).

However, in case the increased current peak value for simultaneously operating all of the compressors 10 exceeds an allowable current range of a circuit breaker installed in the home or building, which is provided with the air conditioning system, the circuit breaker cuts off power supplied to the home or building, thereby forcibly stopping the air conditioning system and all other electric appliances, thus causing their malfunction.

The circuit breaker employs a bimetal formed by attaching two metal plates having different expansion rates to each other. When an overcurrent exceeding the allowable current range flows within the circuit breaker, the circuit breaker, which is installed in the home or building, cuts off the power. That is, in case the total current supplied to the electric appliances connected to a power source exceeds the allowable current range of the circuit breaker, the circuit breaker cuts off the power, thereby forcibly stopping all of the electric appliances connected to the power source, and preventing any accidents generated by the overcurrent.

Particularly, in case where a plurality of appliances, such as the air conditioning system, requiring a comparatively increased current value at their early operation stage are installed in the home or building, it is more likely that the overcurrent will be cut off by the circuit breaker. Further, since the air conditioning system for rapidly satisfying the increased cooling load simultaneously operates all of the compressors whenever the cooling load is increased, the current value for operating the compressors more frequently exceeds the allowable current range of the circuit breaker. Therefore, it is difficult to safely control the above-described conventional air conditioning system.

SUMMARY OF THE INVENTION

Therefore, the present invention has been made in view of the above problems, and it is an object of the present invention to provide an air conditioning system with two compressors and a method for operating the same, in which one compressor is first operated and then the other compressor is additionally operated, i.e., two compressors are sequentially operated, so that a current peak value for operating the compressors does not exceed an allowable current range of a circuit breaker installed in the home or building, thereby safely controlling the air conditioning system and preventing the stoppage of the air conditioning system and other electric appliances connected to power by cutting off the power, thus providing enhanced convenience to users.

In accordance with one aspect of the present invention, the above and other objects can be accomplished by the provision of an air conditioning system with two compressors, comprising: an air conditioner for conditioning air of a room via a cooling cycle formed by a refrigerant passing through compressors, a condenser, an expansion valve, and an evaporator; and a control unit for determining a compression capacity of the refrigerant according to cooling load, and controlling operating states of the compressors so that a peak value of a current required to compress the refrigerant of the compressors is limited.

In accordance with another aspect of the present invention, there is provided a method for operating an air conditioning system with two compressors, comprising: the first step of inputting a full operation order to the compressors according to increased cooling load; the second step of first operating the first compressor, and then sequentially operating the second compressor having a compression capacity of a refrigerant smaller than that of the first compressor, so as to reduce a peak value of an initial current; and the third step of circulating the refrigerant compressed by the operating compressors, so as to satisfy the increased cooling load.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
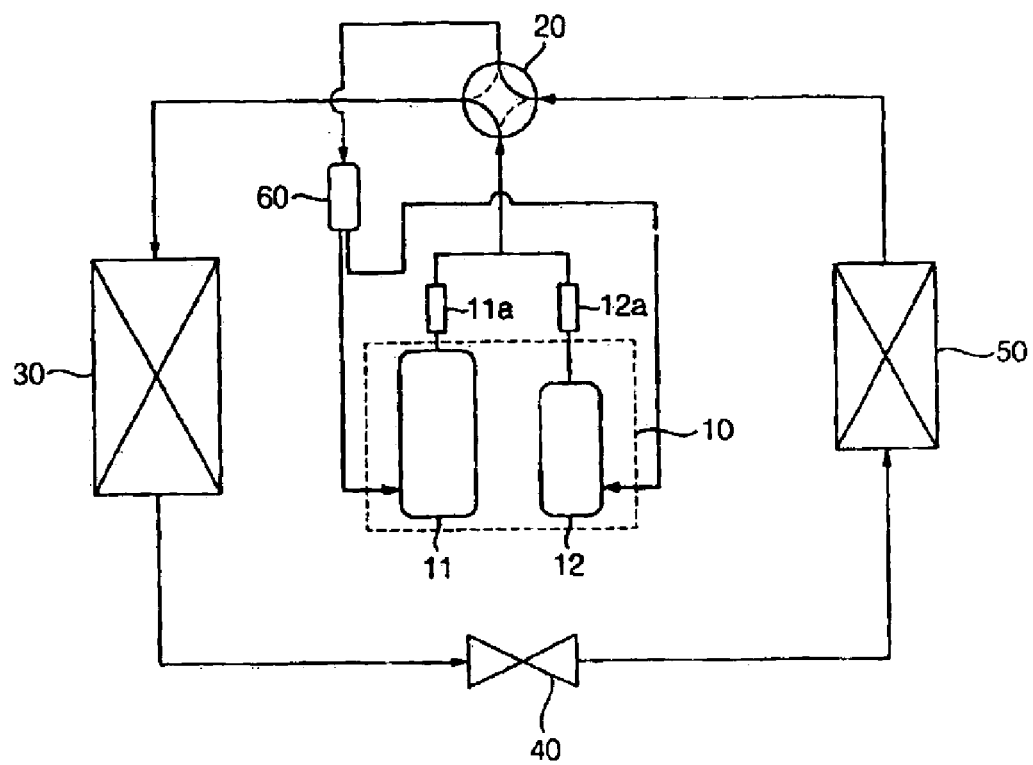
FIG. 1 is a block diagram illustrating a flow of a refrigerant in a conventional air conditioning system.
Figure 3:
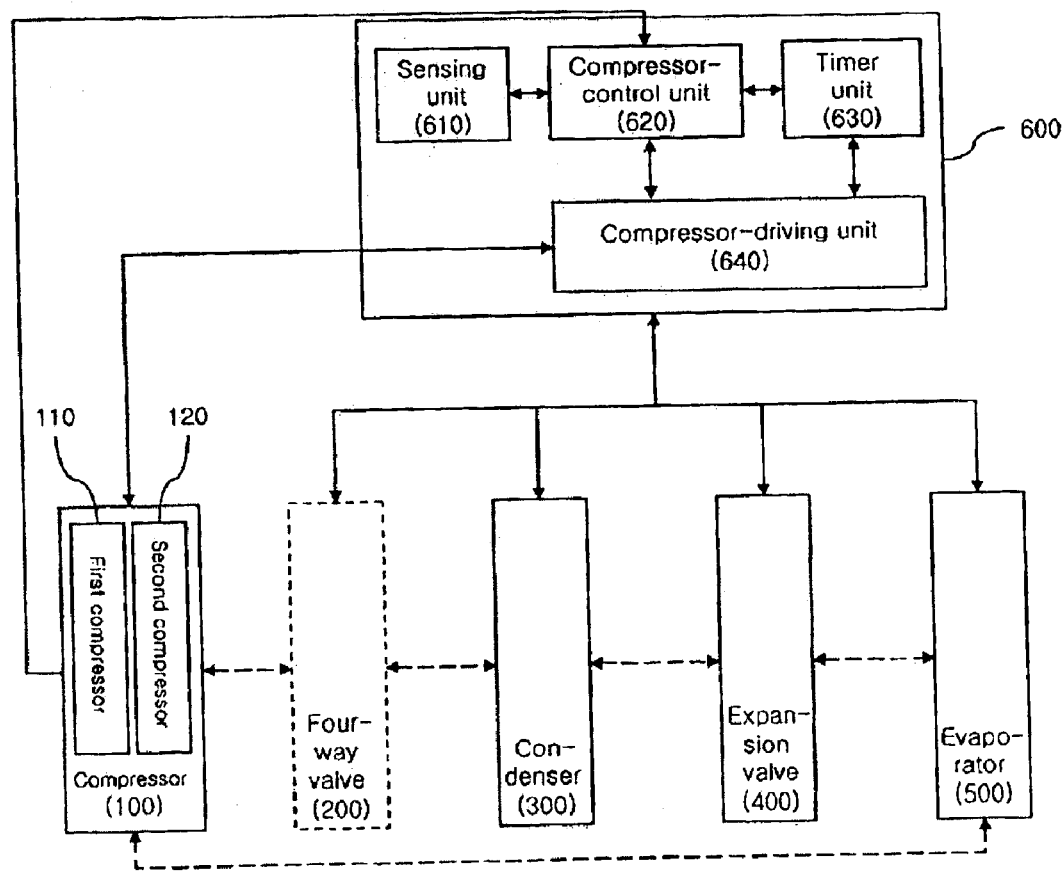
FIG. 3 is a block diagram of an air conditioning system with two compressors in accordance with the present invention.

A heat-pump air conditioning system employing compressors is already described with reference to FIG. 1. FIG. 3 is a block diagram of an air conditioning system with two compressors in accordance with the present invention. In FIG. 3, a solid arrow denotes a flow of a control signal from a control unit to each component of the air conditioner, and a dotted arrow denotes a flow of a refrigerant between components of the air conditioner. With reference to FIG. 3, the air conditioning system with two compressors of the present invention is described, as follows.

Compressors 100 suck a gaseous refrigerant evaporated by an evaporator, and then compress the sucked gaseous refrigerant so as to convert it into a high-pressure state. Thereby, kinetic energy of the molecules within the gaseous refrigerant is increased, thereby causing collisions between the molecules. Then, energy generated by the collisions between the molecules raises the temperature of the gaseous refrigerant so that the gaseous refrigerant is converted into a high-temperature and high-pressure state. Since the above gaseous refrigerant has an increased number of molecules per unit volume, the gaseous refrigerant is easily liquefied at room temperature.

The compressors 100 of the air conditioning system of the present invention include a first compressor 110 and a second compressor 120. Each of the first and second compressors 110 and 120 has a designated compression capacity of the refrigerant so as to compress a specific percentage of the total capacity (100%) of the refrigerant. Herein, the compression capacities of the refrigerant of the first and second compressors 110 and 120 are set by a manufacturer. In accordance with a preferred embodiment of the present invention, the first compressor 110 has a 60% compression capacity of the refrigerant, and the second compressor 120 has a 40% compression capacity of the refrigerant. However, the compression capacity of each compressor is not limited thereto.

A condenser 300 removes heat from the gaseous refrigerant in the high-temperature and high-pressure state discharged from the compressors 100, thereby liquefying the gaseous refrigerant so as to convert it into a liquid refrigerant in a mid-temperature and high-pressure state.

An expansion valve 400 expands the liquid refrigerant in the mid-temperature and high-pressure state, thereby reducing the pressure of the liquid refrigerant so as to convert it into a low-temperature and low-pressure state.

An evaporator 500 absorbs heat from the indoor air, thereby evaporating the liquid refrigerant in the low-temperature and low-pressure state so as to convert it into a gaseous refrigerant in a low-temperature and low-pressure state, thus cooling a room.

A control unit 600 controls the operation of each component, i.e., the compressors 100, the condenser 300, the expansion valve 400, and the evaporator 500. Particularly, the control unit 600 controls the operating states of the two compressors 110 and 120, thereby variably changing the compression capacity of the refrigerant according to cooling load.

A heat-pump air conditioner, additionally having a heating function, further comprises a four-way valve 200 represented by a dotted line. In this case, the control unit 600 controls the four-way valve 200 so as to convert a circulation direction of the refrigerant according to a cooling or heating mode.

The control unit 600 includes a sensing unit 610, a compressor-control unit 620, a timer unit 630, and a compressor-driving unit 640. The sensing unit 610 senses whether the cooling load is increased or not. When the sensing unit 610 senses the increased cooling load, the compressor-control unit 620 outputs a full operation control order for operating the compressors 100. The timer unit 630 measures a designated time from a moment when the full operation control order for operating the compressors 100 is outputted from the compressor-control unit 620. When the full operation control order is outputted from the compressor-control unit 620, the compressor-driving unit 640 first operates the first compressor 110 having a designated compression capacity of the refrigerant, and then sequentially operates the second compressor 120 having a compression capacity of the refrigerant smaller than that of the first compressor 110.

The compressor-driving unit 640 first operates the first compressor 110, and then orders the second compressor 120 to stand by during the designated time measured by the timer unit 630, thereby preventing a rapid increase in initial current value. After the lapse of the designated time, the compressor-driving unit 640 additionally operates the second compressor 120, thereby sequentially operating the first and second compressors 110 and 120.

Therefore, in order to rapidly satisfy the increased cooling load, the control unit 600 of the air conditioning system of the present invention outputs the full operation order to the compressors 100 so that the compression capacity of the refrigerant becomes 100% and the cooling cycle is carried out by the refrigerant. Then, the control unit 600 controls the operating states of the compressors 100 so that the first compressor 110 is first operated, and then the second compressor 120 is additionally operated after the lapse of the designate time. Thereby, the peak value of the current supplied to the compressors 110 does not exceed the allowable current range of the circuit breaker.

Figure 4:
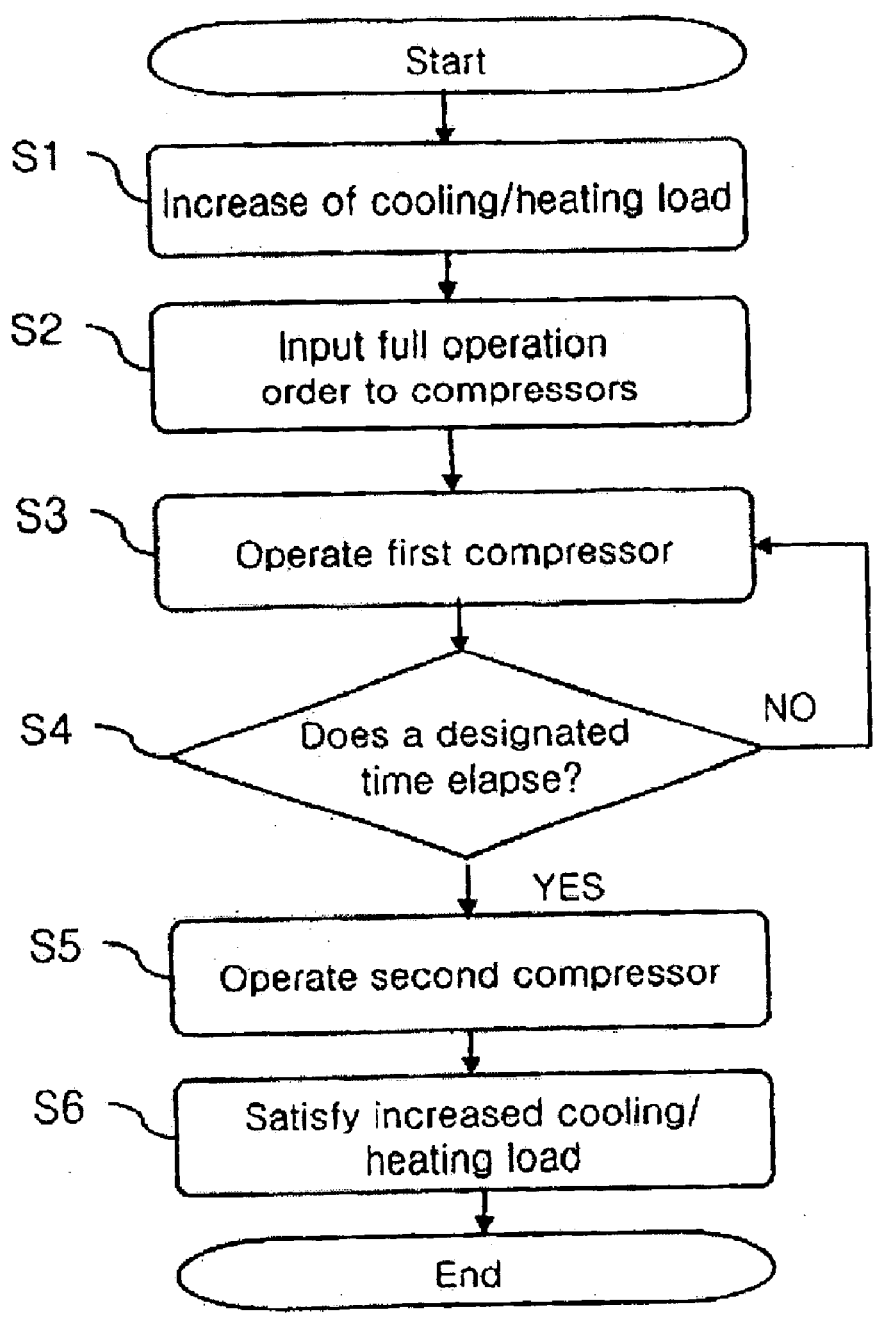
FIG. 4 is a flow chart illustrating a method for operating the air conditioning system with two compressors in accordance with the present invention.
Figure 5:
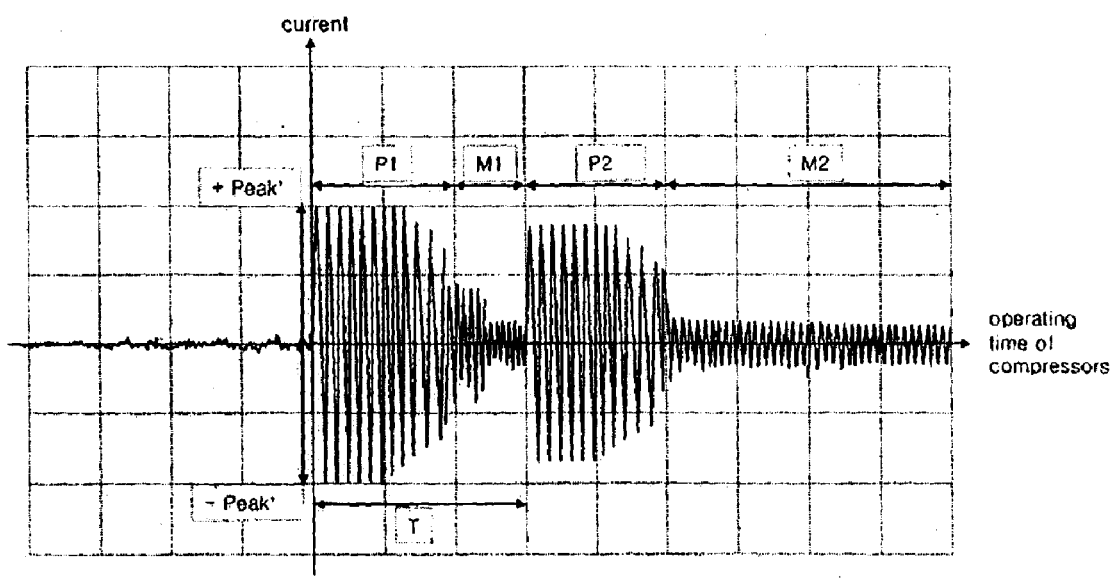
FIG. 5 is a graph showing the variation of current value in the air conditioning system with two compressors in accordance with the present invention.

FIG. 4 is a flow chart illustrating a method for operating the air conditioning system with two compressors in accordance with the present invention, and FIG. 5 is a graph showing the variation of current value in the air conditioning system with two compressors in accordance with the present invention. With reference to FIGS. 4 and 5, the method for operating the air conditioning system with two compressors in accordance with the present invention is described, as follows.

In the cooling mode, when the room temperature rises, the cooling load is increased. (S1)

When the control unit senses the increased cooling load, in order to satisfy the increased cooling load, the control unit inputs a full operation order to the compressors so that the compression capacity of the refrigerant becomes 100% and the cooling cycle is carried out by the refrigerant. (S2)

In order to reduce a current peak value, the first compressor is first operated. (S3) As shown in FIG. 5, a current for initializing the operation of the first compressor is supplied by a power source (P1), thereby operating the first compressor. The first compressor has the compression capacity of the refrigerant larger than that of the second compressor.

The operating first compressor receives a holding current supplied by the power source (M1), thereby maintaining its operating state. Herein, the control unit orders the second compressor to stand by in a stopping state for a designated time (T).

The control unit judges whether the designated time (T) measured from an operating moment of the first compressor has elapsed or not. (S4) After the lapse of the designated time (T), the second compressor in the standby state is additionally operated. (S5) As shown in FIG. 5, a current for initializing the operation of the second compressor is supplied by the power source (P2), and thereby operating the second compressor. Then, a holding current for maintaining the operating states of the first and second compressors is supplied by the power source (M2) to the first and second compressors, thereby maintaining the operating states of the first and second compressors so that the compression capacity of the refrigerant becomes 100% and the cooling cycle is carried out by the refrigerant, thereby satisfying the increased cooling load. (S6)

Figure 2:
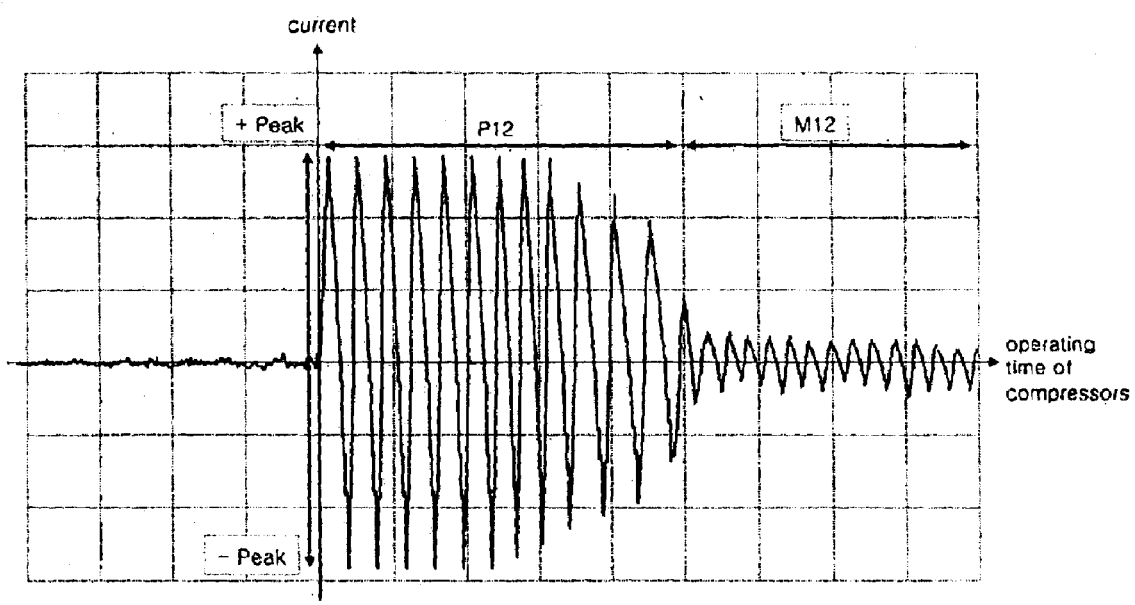
FIG. 2 is a graph showing the variation of current value in the conventional air conditioning system.

In the above-described air conditioning system with two compressors, since the current for sequentially operating the two compressors has a reduced peak value (−Peak to +Peak) compared to the peak value (−Peak' to +Peak') of the current for simultaneously operating the two compressors as shown in FIG. 2, the reduced peak value (−Peak to +Peak) does not exceed the allowable current range of the circuit breaker.

As apparent from the above description, the present invention provides an air conditioning system with two compressors and a method for operating the same, in which one compressor having a comparatively larger capacity is first operated and then the other compressor in a standby state is additionally operated after a lapse of a designated time, i.e., two compressors are sequentially operated, so that a peak value of the current for operating the compressors does not exceed an allowable current range of a circuit breaker installed in the home or building, thereby preventing power cut-off, as well as accidents and/or damage to other electric appliances generated by the power cut-off.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, the compression capacity of each compressor is not limited to the above-described value, but may be variably set by a manufacturer. Further, the above-described technique for reducing a current peak value may be applied to a heat-pump air conditioner having cooling and heating functions as well we the air conditioner having a cooling function.

What is claimed is:

1. An air conditioning system with two compressors, comprising:
an air conditioner that conditions air of a room via a cooling cycle formed by a refrigerant passing through compressors, a condenser, an expansion valve, and an evaporator; and a control unit that determines a compression capacity of the refrigerant according to cooling load, and controls operating states of the compressors so that a peak value of a current required to compress the refrigerant of the compressors is limited, wherein the air conditioner comprises:

a first compressor and a second compressor, wherein the first compressor has a refrigerant compression capacity larger than a refrigerant compression capacity of the second compressor, and the first compressor and second compressor compress a gaseous refrigerant in a low-temperature and low-pressure state so as to convert the gaseous refrigerant into a high-temperature and high-pressure state;

a condenser that condenses the gaseous refrigerant in the high-temperature and high-pressure state so as to convert the gaseous refrigerant into a liquid refrigerant in a mid-temperature and high-pressure state;

an expansion valve that expands the liquid refrigerant in the mid-temperature and high-pressure state so as to convert the liquid refrigerant into a low-temperature and low-pressure state; and an evaporator that evaporates the liquid refrigerant in the low-temperature and low-pressure state so as to convert the liquid refrigerant into a gaseous refrigerant in a low-temperature and low-pressure state, and wherein the control unit comprises:

a sensing unit that senses whether or not the cooling load is increased;

a compressor-control unit that outputs a full operation control order for operating the compressors, when the sensing unit senses the increased cooling load;

a timer unit that measures a designated time from an output of the full operation control order from the compressor-control unit; and a compressor-driving unit that sequentially operates the first and second compressors, when the full operation control order is output from the compressor-control unit, and wherein the compressor-driving unit first operates the first compressor having a refrigerant compression capacity larger than the refrigerant compression capacity of the second compressor, and after a lapse of the designated time, the compressor-driving unit additionally operates the second compressor having the refrigerant compression capacity smaller than the refrigerant compression capacity of the first compressor.

2. The air conditioning system of claim 1, wherein the refrigerant compression capacity of the first compressor is about 60% of the total compression capacity of the air conditioning system and the refrigerant compression capacity of the second compressor is about 40% of the total compression capacity of the air conditioning system.

3. A method for operating an air conditioning system with two compressors, comprising:

inputting a full operation order to a first compressor and a second compressor according to an increased cooling load, wherein the first compressor has a refrigerant compression capacity larger than a refrigerant compression capacity of the second compressor;

operating the first and second compressors by first operating the first compressor having a refrigerant compression capacity larger than the refrigerant compression capacity of the second compressor, and then operating the second compressor having a refrigerant compression capacity smaller than the refrigerant compression capacity of the first compressor, so as to reduce a peak value of an initial current; and circulating the refrigerant compressed by the operating compressors, so as to satisfy the increased cooling load, wherein the operating of the first and second compressors comprises:

operating the first compressor;

measuring a designated time from a start of operation of the first compressor, and instructing the second compressor to stand by in a stopped state; and operating the second compressor after a lapse of the designated time.

* * * * *